US010494097B2

(12) United States Patent
Moran

(10) Patent No.: US 10,494,097 B2
(45) Date of Patent: Dec. 3, 2019

(54) AIR SUPPLY AND RETURN SYSTEM OF A GALLEY OF AN AIRCRAFT

(71) Applicant: THE BOEING COMPANY, Chicago, IL (US)

(72) Inventor: Thomas Joseph Moran, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 311 days.

(21) Appl. No.: 15/369,347

(22) Filed: Dec. 5, 2016

(65) Prior Publication Data

US 2018/0127098 A1 May 10, 2018

Related U.S. Application Data

(60) Provisional application No. 62/417,610, filed on Nov. 4, 2016.

(51) Int. Cl.
*B64D 11/04* (2006.01)
*B64D 11/00* (2006.01)
(Continued)

(52) U.S. Cl.
CPC .......... *B64D 11/04* (2013.01); *B64D 11/0007* (2013.01); *B64D 13/08* (2013.01); *B64D 2013/0629* (2013.01)

(58) Field of Classification Search
CPC ...... B64D 11/04; B64D 11/007; B64D 13/08; B64D 2013/0629; F25D 17/02; F25D 17/06; F25D 19/00; F25D 2400/20
See application file for complete search history.

(56) References Cited

U.S. PATENT DOCUMENTS 4,361,014 A  11/1982 Blain
2013/0047657 A1* 2/2013 Oswald .................. B64D 11/04
62/407
(Continued)

FOREIGN PATENT DOCUMENTS

EP   3034403 B1   2/2019

OTHER PUBLICATIONS

Thomas Joseph Moran; Galley System of an Aircraft; U.S. Appl. No. 14/494,483, filed Nov. 23, 2015; 23 pages.
(Continued)

Primary Examiner — Elizabeth J Martin
(74) Attorney, Agent, or Firm — Jay J. Hoette; The Small Patent Law Group, LLC

(57) ABSTRACT

A galley includes a cart compartment having a chamber defined by a rear wall behind the cart compartment, side walls along sides of the cart compartment, a mid-wall above the cart compartment and a bottom wall below the cart compartment. The galley includes a supply duct having an air supply device at the cart compartment having an air-through supply vent configured to be in flow communication with an air-through galley cart when received in the cart compartment to supply cooled airflow into an interior of the air-through galley cart and an air-over supply vent configured to be in flow communication with the chamber to supply the cooled airflow into the chamber for cooling an exterior of an air-over galley cart when received in the cart compartment. The galley includes a return duct having an air return device receiving the airflow from the cart compartment.

14 Claims, 3 Drawing Sheets

(51) Int. Cl.
*B64D 13/08* (2006.01)
*B64D 13/06* (2006.01)

(56) References Cited

U.S. PATENT DOCUMENTS

| | | |
|---|---|---|
| 2015/0059385 A1 | 3/2015 | Burd |
| 2016/0114892 A1* | 4/2016 | Moran .................. B64D 11/04 |
| | | 244/118.5 |
| 2016/0167785 A1* | 6/2016 | Roth .................. B64D 11/0007 |
| | | 206/335 |

OTHER PUBLICATIONS

Thomas Joseph Moran; Galley Cart and Galley System of an Aircraft; U.S. Appl. No. 14/716,357, filed May 19, 2015; 28 pages.
Examination Report for corresponding EP Application No. 17199916.2-1010 dated Mar. 27, 2019 (6 pages).

* cited by examiner

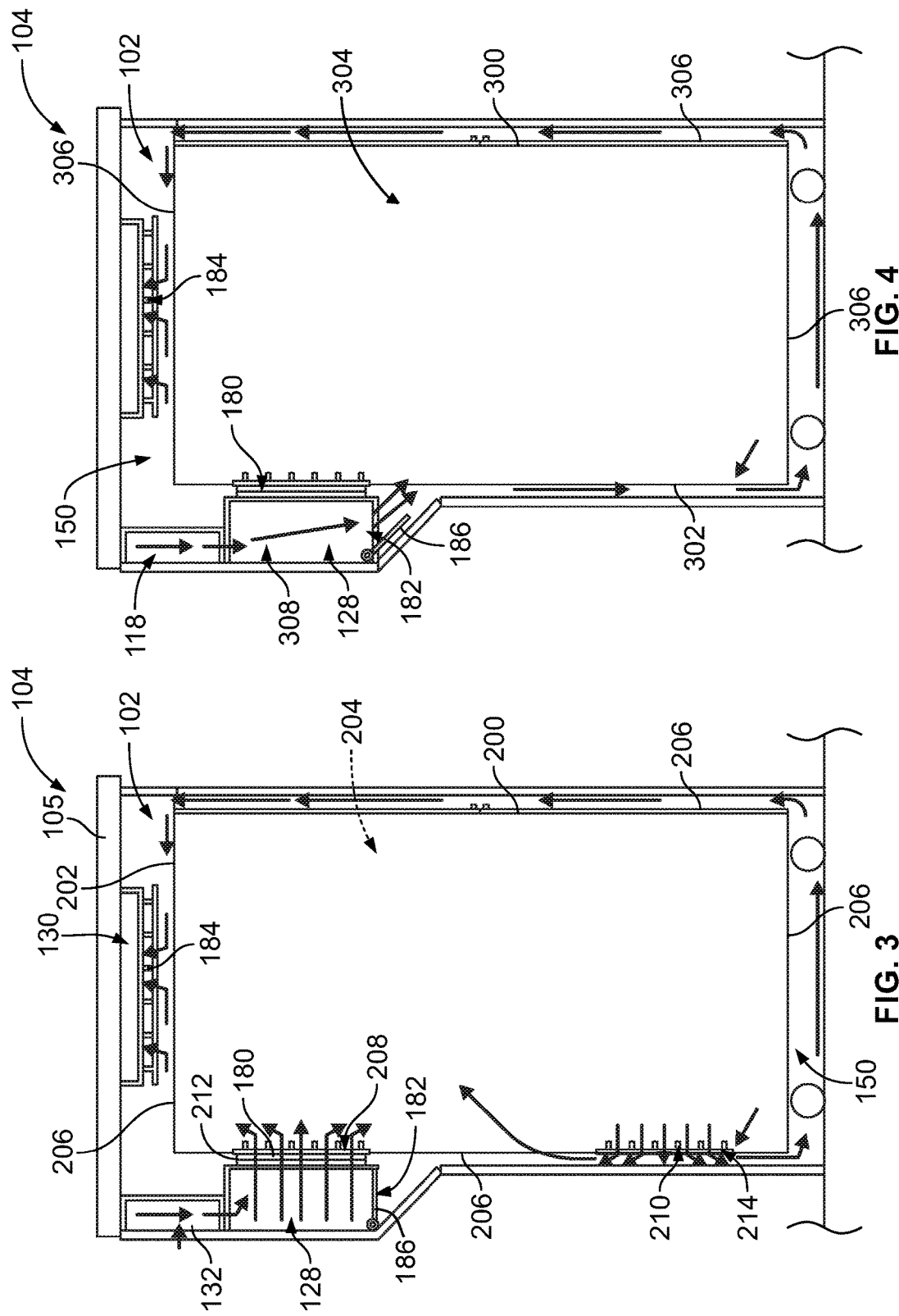

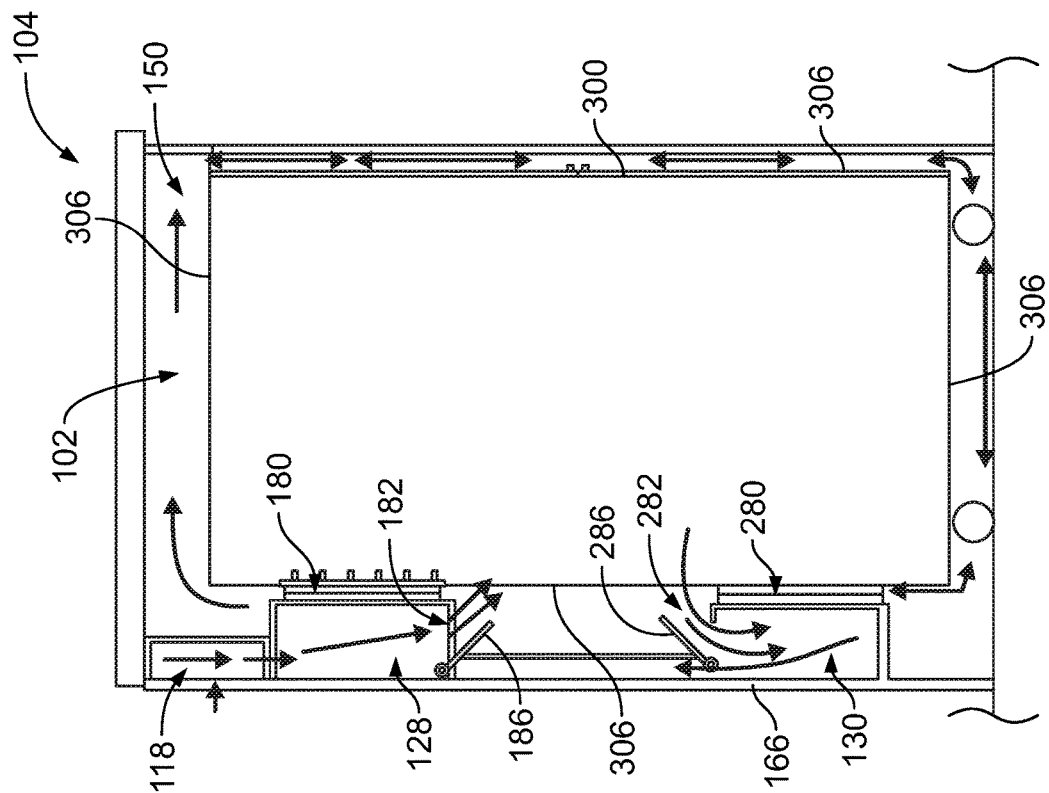
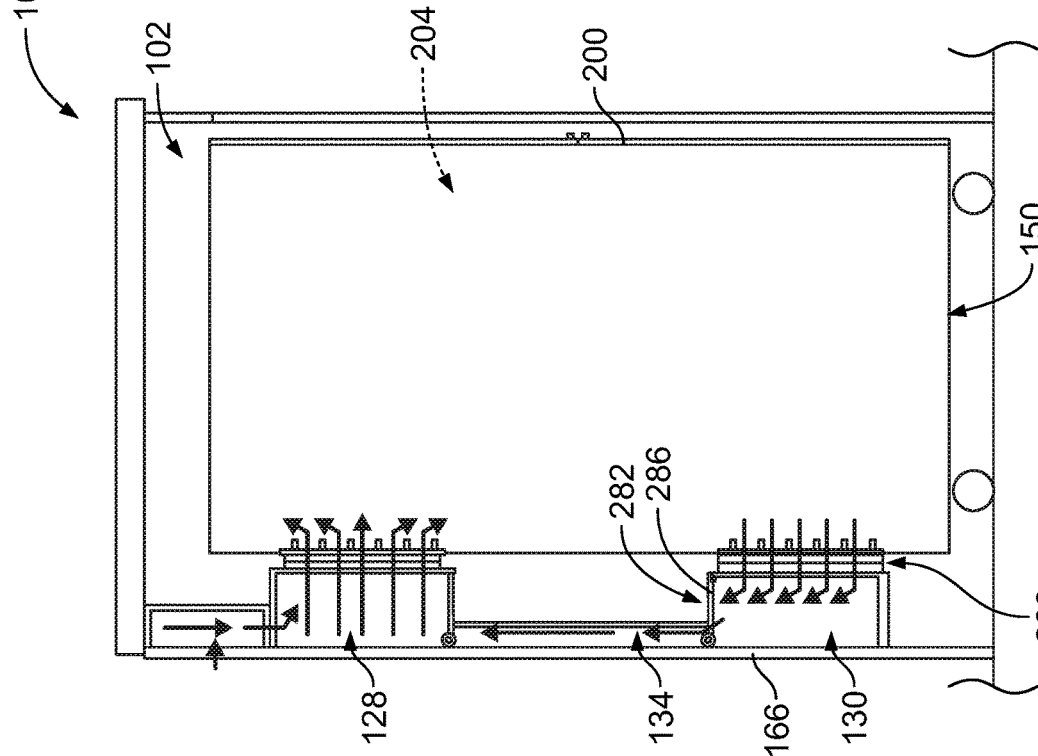

AIR SUPPLY AND RETURN SYSTEM OF A GALLEY OF AN AIRCRAFT

CROSS REFERENCE TO RELATED APPLICATIONS

This application claims the benefit of U.S. Provisional Application No. 62/417,610 filed Nov. 4, 2016, the subject matter of which is herein incorporated by reference in its entirety.

BACKGROUND

The present disclosure relates generally to systems and methods of cooling a galley of an aircraft.

Aircraft typically include multiple galleys to store food and beverages on the aircraft. The food and beverages are typically stored in galley carts which are transported to the aircraft and stored in refrigerated compartments or zones in the galleys. A heat exchanger is typically provided at the top of the galley and supplies cooled air to each of the compartments or zones via a plurality of air ducts and other components. The air ducts and the supply and return devices associated with the air ducts are routed along the rear wall of the galley to the cart compartment to supply the cooled air to the cart compartment and to return the air to the heat exchanger. For example, vertical ducts may extend from the heat exchanger, located above the galley, down the rear wall of the galley to the level of cart compartment, which is located at the bottom of the galley. Horizontal ducts may extend from the corresponding vertical ducts along the various galley carts to supply the air to, or return the air from, the galley carts and the cart compartment.

The air supply and return systems of some aircraft galleys are designed for an air-through-cart cooling arrangement to supply the cooled airflow directly to associated air-through galley carts. Such air supply and return systems are unable to operate with air-over galley carts. Conversely, the air supply and return systems of some aircraft galleys are designed for an air-over-cart cooling arrangement to supply the cooled airflow into the cart compartment to cool associated air-over galley carts. Such air supply and return systems are unable to operate with air-through galley carts. Airlines typically use both types of galley carts and have considerable capital investment in their inventory of galley carts. Logistical problems arise in matching the particular type of galley cart with the particular galley system.

SUMMARY

In accordance with one embodiment, a galley is provided including a cart compartment having a chamber defined by a plurality of walls including a rear wall behind the cart compartment, side walls along sides of the cart compartment, a mid-wall above the cart compartment and a bottom wall below the cart compartment. At least one door is coupled to the cart compartment to enclose and allow access to the cart compartment. The galley includes a supply duct configured to supply cooled airflow to the cart compartment. The supply duct has an air supply device at the cart compartment having an air-through supply vent configured to be in flow communication with an air-through galley cart when received in the cart compartment to supply the cooled airflow into an interior of the air-through galley cart and an air-over supply vent configured to be in flow communication with the chamber to supply the cooled airflow into the chamber for cooling an exterior of an air-over galley cart when received in the cart compartment. The galley includes a return duct having an air return device receiving the airflow from the cart compartment.

In a further embodiment, an air supply and return system for a heat exchanger of a galley is provided including a supply duct configured to extend from the heat exchanger to a cart compartment of the galley, an air-through supply vent in flow communication with the supply duct and configured to be in flow communication with an air-through galley cart in the cart compartment, an air-over supply vent in flow communication with the supply duct and configured to be in flow communication with the cart compartment for supplying cooled airflow for an air-over galley cart in the cart compartment, and a return duct configured to extend from the cart compartment to the heat exchanger to return air to the heat exchanger. The return duct has an air return device in flow communication with the return duct and configured to be in flow communication with the cart compartment to receive airflow therefrom.

In another embodiment, a galley is provided including a rear wall, a mid-wall oriented with respect to the rear wall, and a cart compartment at least partially defined by the rear wall and the mid-wall being configured to receive air-through galley carts and being configured to receive air-over galley carts. The galley includes a supply duct along the rear wall configured to supply cooled airflow to the cart compartment. The supply duct has an air supply device at the cart compartment and an air-through supply vent and an air-over supply vent. The galley includes a return duct attached to the mid-wall at the top of the cart compartment having a return air device receiving airflow from the cart compartment.

The features and functions that have been discussed can be achieved independently in various embodiments or may be combined in yet other embodiments, further details of which can be seen with reference to the following description and drawings.

BRIEF DESCRIPTION OF THE DRAWINGS

FIG. 3 is a cross-sectional view of a portion of the galley in an air-through cooling arrangement with an air-through galley cart.

FIG. 4 is a cross-sectional view of a portion of the galley in an air-over cooling arrangement with an air-over galley cart.

FIG. 5 is a cross-sectional view of a portion of the galley in an air-through cooling arrangement with an air-through galley cart.

FIG. 6 is a cross-sectional view of a portion of the galley in an air-over cooling arrangement with an air-over galley cart.

DETAILED DESCRIPTION

Figure 1:
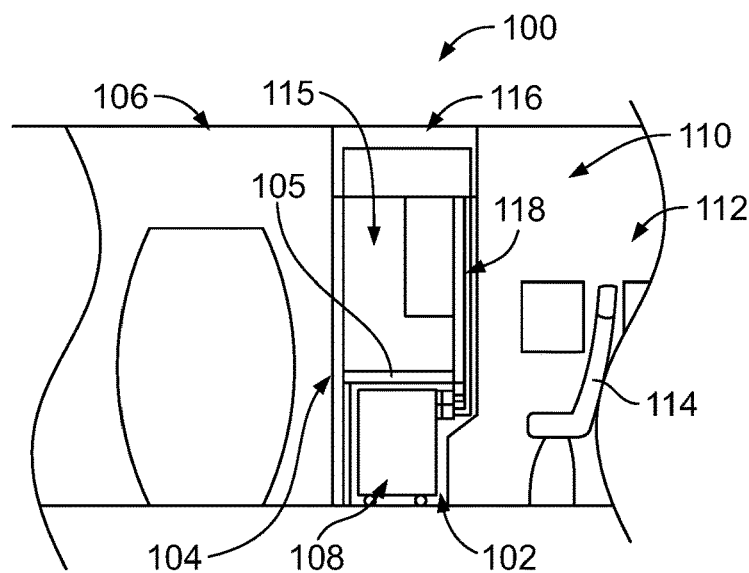
FIG. 1 is a schematic illustration of an exemplary galley system for an aircraft.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a galley system for an aircraft configured to supply cooling air to a cart compartment of a galley monument, or simply galley, for cooling galley carts. Various embodiments provide an efficient cooling environment for both air-through galley carts and air-over galley carts using different cooling arrangements. Various embodiments provide air supply and return devices that are capable of providing a cooling environment for both air-through galley carts and air-over galley carts. Various embodiments provide cooling ducts of the galley system that are arranged to reduce a size or footprint of the galley monument, which may provide additional space in the passenger compartment, such as for adding additional room for passenger seating and/or additional leg room.

FIG. 1 is a schematic illustration of an exemplary galley system 100 for an aircraft 106. The galley system 100 is used to cool galley carts 108 held in cart compartments 102 of a galley 104. In an exemplary embodiment, the galley system 100 is usable with both air-through galley carts and air-over galley carts and provides cooling for such galley carts when loaded into the cart compartment 102.

The galley 104 defines one or more cart compartments 102, which are typically arranged below a mid-wall 105 of the galley 104, which may define a counter and be referred to hereinafter as counter 105. The mid-wall 105 defines a top of the cart compartment 102. The galley 104 is positioned within a cabin 110 of the aircraft 106, and the cabin of the aircraft 106 is divided into a passenger area 112, where passenger seats 114 are located, and a galley area 115, where the galley 104 is located. The passenger area 112 is the area exterior of the galley 104 within the aircraft 106 where passengers are able to be located. The galley area 115 has a working area for the galley crew forward of the galley 104 where the cart compartments 102, counter 105 and cabinets or storage bins may be accessed. Space dedicated to the galley 104 is unusable for passenger seats 114 or other purposes such as lavatories, and thus it may be desirable for aircraft manufacturers to reduce the footprint of the galley area 115 in order to increase the passenger area 112 to increase revenue of each flight for aircraft operators.

As used herein, a cart compartment is an insulated or uninsulated volume that is utilized to store one or more galley carts on the aircraft 106. A galley cart, as used herein, is a portable device that is used to store food and/or beverages that are transported from a caterer to the aircraft 106 or from the cart compartments 102 to other parts of the aircraft 106 for serving the food and/or beverages. The galley carts may include wheels, however some galley carts may be hand carried boxes in some embodiments. As used herein, an air-through galley cart is a galley cart that is internally cooled by forcing cooling airflow through the interior of the galley cart to lower the temperature of the galley cart. An air-over galley cart, as used herein, is a galley cart that is externally cooled by passing cooling airflow around the exterior of the galley cart to lower the internal temperature of the galley cart.

The galley 104 may include any number of cart compartments 102 and the aircraft 106 may include any number of galleys 104. The galleys 104 are typically arranged near the doors of the aircraft 106, such as at the fore and/or aft of the cabin 110, but may be located mid-cabin in some embodiments. Each cart compartment 102 may hold any number of galley carts 108. The galleys 104 may be used for the storage and/or preparation of food or beverages. Some galleys 104 may be bar units used strictly for preparation of beverages. Some galleys 104 may be incorporated into other monuments used for other purposes such as closets, workstations, lavatories, and the like.

The galley system 100 includes a heat exchanger 116 that provides cooled air. The heat exchanger 116 may be positioned above the galley 104 (e.g., in the crown of the aircraft 106), as in the illustrated embodiment, may be positioned in the galley 104, or may be positioned below the galley 104 (e.g., in the belly of the aircraft 106). The galley system 100 includes an airflow supply and return system 118, in flow communication with the heat exchanger 116 and the cart compartments 102, to channel the air supply from the heat exchanger 116 to the cart compartments 102 and back to the heat exchanger 116.

Figure 2:
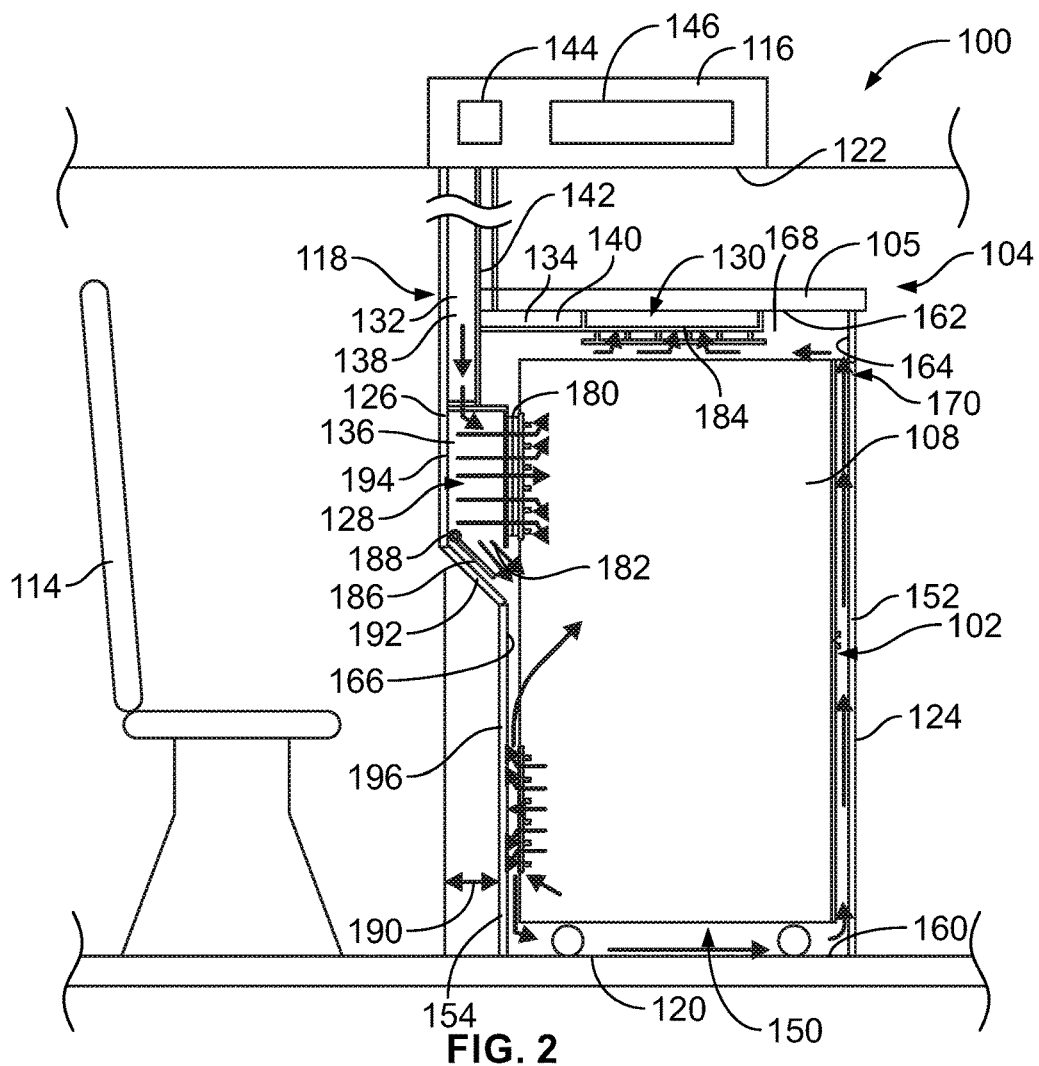
FIG. 2 is a cross-sectional view of a galley of the galley system in accordance with an exemplary embodiment.

FIG. 2 is a cross-sectional view of the galley 104 and galley system 100 in accordance with an exemplary embodiment. The galley 104 includes a bottom 120, a top 122, a front 124 and a rear 126 opposite the front 124, and may include at least one side (not shown). The airflow supply and return system 118 includes an air supply device 128 supply cooled airflow into the cart compartment 102 and an air return device 130 returning airflow from the cart compartment 102 to the heat exchanger 116 (shown in FIG. 1). Air can flow into and out of the cart compartment 102 through the air supply and return devices 128, 130, respectively. Optionally, multiple air supply and return devices 128, 130 may be provided, such as for interacting with different galley carts 108. The rear 126 may be fore facing, aft facing or side facing, depending on the orientation of the galley 104 within the cabin 110. The rear 126 may face the passenger area 112 (e.g., passenger seats 114 may be located behind the rear 126, in front of the rear 126, and the like); however in alternative embodiments, the rear 126 may be positioned against a bulkhead.

In an exemplary embodiment, the heat exchanger 116 is positioned at the top 122 of the galley 104. The heat exchanger 116 includes a fan 144 used to increase the flow of air through the galley system 100. The fan 144 forces the airflow through the airflow supply and return system 118 and directs the air over a galley chilling unit 146 used to reduce the temperature of the airflow. The fan 144 may be positioned in the airflow supply and return system 118, such as between a return duct and a supply duct. The fan 144 may be positioned upstream of the galley chilling unit 146; however, the fan 144 may be positioned at other locations in alternative embodiments. In one embodiment, the galley chilling unit 146 is a refrigeration unit, which includes an evaporator, a condenser, a compressor, and an expansion valve (not shown). In another embodiment, the galley chilling unit 146 is a liquid-cooled galley chilling unit that provides chilled liquid, such as a refrigerant, to the heat exchanger 116 to cool the air supply. Heat exchanging of the liquid may be performed remote from the heat exchanger 116 and from the galley 104, such as in the belly of the aircraft 106.

The airflow supply and return system 118 is arranged within the galley 104. Components of the airflow supply and return system 118 may be routed in various locations to supply and return the air as needed. In the illustrated embodiment, components of the airflow supply and return system 118 are generally arranged along the rear 126 of the galley 104, such as behind the cabinets, cart compartments 102, and other compartments of the galley 104. In an exemplary embodiment, the components of the airflow supply and return system 118 are routed in areas to reduce a depth of at least a portion of the galley 104. For example, one or more ducts of the airflow supply and return system 118 are routed to locations other than behind the cart compartment 102 to reduce the depth of the cart compartment 102, which may decrease the footprint of the galley area 115, and thus increase the footprint of the passenger area 112. For example, in the illustrated embodiment, the bottom half of the cart compartment 102 has a reduced depth to increase leg room in the passenger area 112.

The airflow supply and return system 118 includes a plurality of ducts to supply and return air to the cart compartment 102 and the galley cart 108. For example, the system 118 includes at least one cooling air supply duct 132 to supply cooled air to the cart compartment(s) 102 and at least one air return duct 134 to return air to the heat exchanger 116. The ducts 132, 134 may be embedded in the walls or structures defining the galley 104 and/or the cabinets, compartments, and the like of the galley 104. The supply and return ducts 132, 134 may be defined by separate structures, such as sheet metal ducts preformed and set in the walls. Alternatively, the ducts 132, 134 may be defined by the walls themselves, such as by bores or channels in the walls. The walls may define portions or sides of the ducts 132, 134.

The supply duct 132 includes a horizontal supply duct 136 and a vertical supply duct 138. The vertical supply duct 138 extends between the horizontal supply duct 136 and the heat exchanger 116. The horizontal supply duct 136 extends along the cart compartment(s) 102 to supply cooled air to each of the locations of the cart compartment(s) 102 configured to receive galley carts 108. In various embodiments, the horizontal supply duct 136 defines a manifold for supplying cooled air to multiple cart compartments 102. In the illustrated embodiment, the horizontal supply duct 136 is positioned at the rear 126, such as behind the galley carts 108. The horizontal supply duct 136 may be positioned at other locations in alternative embodiments, such as along the top of the cart compartments 102 (e.g., directly under the counter 105 above the galley carts 108), along the bottom 120 (e.g., along the floor below the galley carts 108), and the like. Other arrangements of supply and return ducts are possible in alternative embodiments.

The return duct 134 includes a horizontal return duct 140 and a vertical return duct 142. The vertical return duct 142 extends between the horizontal return duct 140 and the heat exchanger 116. The horizontal return duct 140 extends along the cart compartment(s) 102 to return air from one or more locations within the cart compartments 102, such as from each location configured to receive one of the galley carts 108. In the illustrated embodiment, the horizontal return duct 140 is positioned at the top of the cart compartment 102, such as above the galley cart 108. The horizontal return duct 140 may be positioned at other locations in alternative embodiments, such as along the bottom of the cart compartments 102, along the rear 126, and the like. Other arrangements of supply and return ducts are possible in alternative embodiments.

The cart compartment 102 is positioned near the bottom 120, such as below the counter 105, for loading and unloading of the galley carts 108 into a chamber 150 defined by the cart compartment 102. Cabinets or other non-cooled compartments may be provided above the cart compartment 102, such as above the counter area of the galley 104. In an exemplary embodiment, the cart compartment 102 includes one or more doors 152 at the front 124 that are opened to provide access to the chamber 150 of the cart compartment 102, such as to load and unload the galley carts 108 through the front 124. The door(s) 152 are closed to retain the galley carts 108 in the cart compartment 102 and to enclose the cooling space in the chamber 150. The doors 152 provide thermal insulation for the cooling space. In an exemplary embodiment, when the galley cart 108 is positioned in the chamber 150, a space is defined about the galley cart 108. Air is able to flow around the galley cart 108 in the space for an air-over cooling arrangement.

The cart compartment 102 includes a plurality of walls 154 defining the chamber 150. In an exemplary embodiment, the cart compartment 102 includes a bottom wall 160, a top wall 162, a front wall 164, a rear wall 166 and side walls 168. The front wall 164 includes a doorway 170 defined therethrough. The doorway 170 allows the galley cart 108 to be loaded into, and unloaded from, the cart compartment 102. The door 152 is coupled to the front wall 164 to close the doorway 170. The top wall 162 may be defined by the counter 105 of the galley 104. The bottom wall 160 may be defined by a floor of the cabin 110.

The rear wall 166 is provided along the rear 126 of the galley 104. In various embodiments, the rear wall 166 is exposed to the exterior environment of the galley 104. For example, the rear wall 166 is exposed to the passenger area 112 of the cabin 110. In an exemplary embodiment, at least a portion of the rear wall 166 is shifted or jogged forward to reduce the footprint of the galley 104. At least a portion of the rear wall 166 is shifted toward the galley cart 108 to reduce the volume of the chamber 150 of the cart compartment 102. Such reduction in volume of the cart compartment 102 equates to an increase in volume of the passenger area 112. For example, more space may be provided for passenger seats 114. For example, more leg room may be provided for passengers in the passenger seats 114. To create additional room in the cart compartment 102, for shifting the rear wall 166 toward the galley cart 108, at least some of the components of the airflow supply and return system 118 may be moved away from such portions of the rear wall 166. For example, portions or all of the rear wall 166 may be devoid of air ducts or other components of the airflow supply and return system 118. In the illustrated embodiment, both the supply and return ducts 132, 134 are located at or near the top wall 162, as opposed to being provided along the rear wall 166 at the top and the bottom as is typical of conventional systems. In the illustrated embodiment, the supply and return ducts 132, 134 are both positioned directly below the counter 105, and the rear wall 166, below the supply and return ducts 132, 134, is jogged or shifted forward to reduce the depth of the chamber 150.

The air supply device 128 and the air return device 130 are arranged in the cart compartment 102 to provide cooling airflow for both an air-through cooling arrangement and an air-over cooling arrangement. The air supply device 128 is in flow communication with the supply duct 132. The air return device 130 is in flow communication with the return duct 134. In an exemplary embodiment, the air supply device 128 has an air-through supply vent 180 configured to be in flow communication with an air-through galley cart when received in the cart compartment 102 to supply the cooled airflow into an interior of the air-through galley cart and an air-over supply vent 182 configured to be in flow communication with the chamber 150 to supply the cooled airflow into the chamber 150 for cooling an exterior of an air-over galley cart when received in the cart compartment 102. In the illustrated embodiment, the air return device 130 includes an air return vent 184 configured to be in flow communication with the chamber 150 to receive the air from the chamber 150 and direct the return air into the return duct 134. In various embodiments, the air return vent 184 is an air grill through which air is able to flow. The air grill does not necessarily engage the galley cart 108 but rather may be position within the chamber 150 to receive air from the space around the galley cart 108. In other various embodiments, the air return device 130 includes an air-through return vent and an air-over return vent similar to the vents of the air supply device 128.

In various embodiments, the air-through supply vent 180 is a cart valve configured to engage and/or mate with the galley cart 108. The air-through supply vent 180 seals to the galley cart 108, such as to corresponding vents or openings of the air-through galley cart or to the outer surface of the air-over galley cart. The air-over supply vent 182 includes a valve 186 for controlling airflow through the air-over supply vent 182. For example, the valve 186 is movable between an open position and a closed position. The valve 186 is in the open position when the air-over galley cart is in the cart compartment 102 and is in the closed position or partially closed position when the air-through galley cart is in the cart compartment 102. As such, significant cooled airflow does not leak into the chamber 150 when the air-through galley cart is installed. In various embodiments, the valve 186 is a passive valve controlled based on pressure in the system. For example, when the air pressure increases, such as when the cooled air is being forced into the air supply device 128 by the fan 144 and is unable to flow through the air-through supply vent 180 (for example, the air-through supply vent 180 is closed or blocked by an air-over galley cart), then the air pressure overcomes the closing force of the valve 186 and the valve 186 opens. In such embodiments, a spring or gravity may hold the valve 186 closed, which may be overcome by the air pressure. In other various embodiments, the valve 186 is an active valve controlled by a valve controller 188. The valve controller 188 may be a solenoid, a motor or another device for opening and closing the valve 186. The valve controller 188 opens and closes the valve 186 based on the type of galley cart in the cart compartment 102. For example, the valve 186 is closed when an air-through galley cart is installed and the valve 186 is open when an air-over galley cart is installed in the cart compartment 102. In various embodiments, the air-through supply vent 180 may be at least partially open when air-over galley carts are installed allowing at least some airflow therethrough into the cart compartment 102. In other various embodiments, the air-over supply vent 182 may be provided without the valve 186 and is always open, even when an air-through galley cart is in the cart compartment 102 allowing at least some airflow into the cart compartment.

In an exemplary embodiment, both the supply duct 132 and the return duct 134 are routed along the rear wall 166 within the top half of the cart compartment 102. The ducts 132, 134 may run along the interior surface of the rear wall 166 and/or the top wall 162 within the chamber 150. In the illustrated embodiment, the rear wall 166 along the top half is generally positioned a first distance from a rear of the galley cart 108, whereas the rear wall 166 along the bottom half is generally positioned a second distance from the rear of the galley cart 108 less than the first distance. The first distance is greater than the second distance to accommodate the air supply device 128 and the supply duct 132. The rear wall 166 in the top half is positioned further rearward as compared to the rear wall 166 in the bottom half, which is positioned further forward. Moving the rear wall 166 forward toward the galley cart 108 reduces the footprint of the galley 104 and provides additional gained space 190 in the passenger area 112. For example, shifting the rear wall 166 forward increases leg room of the row of passenger seats 114 behind the cart compartment 102.

In an exemplary embodiment, the rear wall 166 includes a jogged section 192 that shifts portions of the rear wall 166 closer to the galley cart 108 as compared to other portions. For example, the rear wall 166 is non-planar with an upper rear wall 194 above the jogged section 192 and a lower rear wall 196 below the jogged section 192. The jogged section 192 and the lower rear wall 196 are provided below the air supply device 128. In the illustrated embodiment, the upper rear wall 194 is positioned a first depth from the door 152 and the lower rear wall 196 is positioned a second depth from the door 152 that is less than the first depth. Optionally, the jogged section 192 may be positioned close to the counter 105 to provide a large amount of space savings and more leg room for the passenger area 112.

In an exemplary embodiment, the jogged section 192 reduces the depth of the corresponding portion (e.g., the bottom half) of the chamber 150 by a significant amount. For example, the jogged section 192 may reduce the depth of the chamber 150 by at least 5%. Optionally, the jogged section 192 may reduce the depth of the chamber 150 by 10% or more. The jogged section 192 may increase leg room of rows of passenger seats 114 behind the cart compartment 102. Optionally, the jogged section 192 may shift the position of the lower rear wall 196 of the rear wall 166 by at least 3 in (7.6 cm). The jogged section 192 may shift the lower rear wall 196 by more than 3 in (7.6 cm) in alternative embodiments. In aircraft 106 having multiple galleys 104, reducing the footprint of multiple galleys 104 may allow additional rows of passenger seats 114 in the aircraft 106, which may increase the revenue produced by the aircraft 106.

In various embodiments, rather than having the jogged section 192 below the air supply device 128, the jogged section may be above the air supply device 128. For example, the air supply device 128 may be positioned in the bottom half of the cart compartment 102. Such an arrangement may be used in an aft facing galley where the seats abut against the rear wall 166. Having the reduced depth higher up the rear wall 166 may allow additional space for the passenger seat to recline. In other various embodiments, the air supply device 128 may be mounted under the mid-wall 105 rather than in the rear wall 166, moving the jogged section further up the rear wall 166 or allowing the entire rear wall 166 to be shifted forward to reduce the depth of the galley 104.

FIG. 3 is a cross-sectional view of a portion of the galley 104 in an air-through cooling arrangement with an air-through galley cart 200. The air-through galley cart 200 includes cart walls 202 defining an interior 204 configured to receive items such as food and beverage items. The cart walls 202 have exterior surfaces 206. The air-through galley cart 200 includes a cart supply vent 208 that receives a supply of cold air and a cart return vent 210 through which the air is expelled from the air-through galley cart 200. In the illustrated embodiment, both the cart supply vent 208 and the cart return vent 210 are provided along a rear wall of the cart walls 202.

The air-through galley cart 200 is received in the chamber 150 of the cart compartment 102. The air-through galley cart 200 is positioned in the cart compartment 102 to be in flow communication with the air supply device 128 and the air return device 130. For example, the cart supply vent 208 is aligned with and engages the air-through supply vent 180 of the air supply device 128. The air-through supply vent 180, in the illustrated embodiment, is at a front of the air supply device 128 that faces the door across the cart compartment 102 to directly interact with the air-through supply cart 200 when loaded into the cart compartment 102. The air-through galley cart 200 receives the cooled air from the supply duct 132 through the supply vents 180, 208. Optionally, at least one of the supply vents 180, 208 includes a sealing gasket 212 to provide a sealed air channel between the air supply device 128 and the air-through galley cart 200. The cart supply vent 208 includes openings or channels configured to be aligned with openings or channels in the air-through supply vent 180. In an exemplary embodiment, the air from the supply duct 132 passes directly into the air-through galley cart 200 without entering the chamber 150.

In an exemplary embodiment, when the air-through galley cart 200 is received in the cart compartment 102, the air-over supply vent 182 is at least partially if not fully closed. For example, the valve 186 is closed such that little or no air flows into the chamber 150 from the air supply device 128. Rather, the cooled airflow is directed through the air-through supply vent 180 into the interior 204 of the air-through galley cart 200. The cooled air is used to cool the beverage and food items in the air-through galley cart 200. Spent air from the air-through galley cart 200 is rejected from the interior of the air-through galley cart 200 through the cart return vent 210. The cart return vent 210 is in flow communication with the air return vent 184. In the illustrated embodiment, the spent air is rejected into the chamber 150, such as into the space around the air-through galley cart 200. For example, the air return vent 210 includes a plurality of openings or channels 214 that allow the air to flow from the interior 204 to the exterior of the air-through galley cart 200. The air flows around the air-through galley cart 200 to the air return vent 184. In the illustrated embodiment, the air return vent 184 is provided at the mid-wall 105; however, the air return vent 184 may be provided at other locations, such as near the bottom of the chamber 150 aligned with the cart return vent 210.

FIG. 4 is a cross-sectional view of a portion of the galley 104 in an air-over cooling arrangement with an air-over galley cart 300. The air-over galley cart 300 includes cart walls 302 defining an interior 304 configured to receive items such as food and beverage items. The cart walls 302 have exterior surfaces 306. The air-over galley cart 300 does not include cart supply and return vents like the air-through galley cart 200 (shown in FIG. 3). Rather, the interior 304 is closed off from the air supply. The interior space, and corresponding food and beverages contained within the interior 304, are cooled by lowering the temperature of the cart walls 302 using the cooling airflow around the exterior surfaces 306. The chamber 150 receives the supply of cold air from the air supply device 128. The airflow is circulated in the space around the air-over galley cart 300 before returning to the air return vent 184. As the air is circulated in the space, the air-over galley cart 300 is cooled.

The air-over galley cart 300 is received in the chamber 150 of the cart compartment 102 and cooled by the cooling airflow from the air supply and return system 118. In an exemplary embodiment, the rear exterior surface 306 of the air-over galley cart 300 blocks the air-through supply vent 180 to restrict airflow therethrough. Rather, the air from the air supply device 128 passes through the air-over supply vent 182 into the chamber 150. The valve 186 is opened to allow the cooled airflow to flow from a delivery chamber 308 into the chamber 150. In various embodiments, the valve 186 is forced open when the air pressure in the delivery chamber is high enough to force the valve 186 open. For example, when the air-through supply vent is blocked, the air pressure builds up enough to force the valve 186 open. In other various embodiments, the valve controller 188 (shown in FIG. 2) may be used to open the valve 186.

In an exemplary embodiment, the air-over supply vent 182 is provided at a bottom of the air supply device 128, which faces the bottom wall of the cart compartment 102. As such, the air is directed downward from the air supply device 128. Optionally, the air-over galley cart 300 is positioned adjacent the air-over supply vent 182 to direct the airflow around the air-over galley cart 300. For example, the cart walls 302 direct the airflow from the air-over supply vent 182 downward such that the air flows around the air-over galley cart 300 rather than flowing directly toward the air return device 130. The cart walls 302 block the air from short circuiting directly from the air-over supply vent 182 to the return vent 184, thus forcing the airflow to circulate in the cart compartment 102.

FIG. 5 is a cross-sectional view of a portion of the galley 104 in an air-through cooling arrangement with an air-through galley cart 200 in accordance with an exemplary embodiment. In the illustrated embodiment, the galley 104 positions the air return device 130 in the rear wall 166 below the air supply device 128. The rear wall 166 does not include the jogged section as the rear wall 166 accommodates the air return device 130 and the return duct 134 in along the rear wall 166.

The air return device 130 includes an air-through return vent 280 configured to be in flow communication with the air-through galley cart 200 when received in the cart compartment 102 to return the cooled airflow from the interior 204 of the air-through galley cart 200 directly into the return duct 134. The air return device 130 includes an air-over return vent 282 configured to be in flow communication with the chamber 150 to return the airflow from the chamber 150 into the return duct 134, such as when the air-over galley cart 300 (shown in FIG. 5) is received in the cart compartment 102. In various embodiments, the air-through return vent 280 is a cart valve configured to engage and/or mate with the air-through galley cart 200. The air-through return vent 280 seals to the air-through galley cart 200.

The air-over return vent 282 includes a valve 286 for controlling airflow through the air-over return vent 282. For example, the valve 286 is movable between an open position and a closed position. The valve 286 is closed (for example, in a fully closed position or a partially closed position) when the air-through galley cart 200 is in the cart compartment 102. As such, significant cooled airflow does not leak into the chamber 150 when the air-through galley cart 200 is installed.

FIG. 6 is a cross-sectional view of a portion of the galley 104 in an air-over cooling arrangement with the air-over galley cart 300. FIG. 6 illustrates an embodiment having the air return device 130 at the bottom of the rear wall 166. The chamber 150 receives the supply of cold air from the air supply device 128. The airflow is circulated in the space around the air-over galley cart 300 before returning to the air return device 130. As the air is circulated in the space, the air-over galley cart 300 is cooled. When the air-over galley cart 300 is in the cart compartment 102, the valve 286 is able to be opened to allow airflow through the air-over return vent 282. The valve 286 may be a passive valve using air pressure to open the valve 286 or an active valve using a valve controller (not shown) to open the valve 286.

The air-over galley cart 300 is received in the chamber 150 of the cart compartment 102 and cooled by the cooling airflow from the air supply and return system 118. In an exemplary embodiment, the rear exterior surface 306 of the air-over galley cart 300 blocks the air-through supply vent 180 and the air-through return vent 280 to restrict airflow therethrough. Rather, the air from the air supply device 128 passes through the air-over supply vent 182 into the chamber 150 and is returned through the air-over return vent 282. The valves 186, 286 are opened to allow the cooled airflow to flow into and out of the chamber 150. Optionally, a barrier wall may be provided in the cart compartment 102 to block the air from flowing directly from the air supply device 128 to the air return device 130. Other types of diverters may be used to circulate the air in the cart compartment 102. In other various embodiments, rather than having the air-over supply vent 182 at the bottom of the air supply device 128, the air-over supply vent 182 may be provided at the top of the air supply device 128 and/or rather than having the air-over return vent 282 at the bottom of the air return device 130, the air-over return vent 282 may be provided at the bottom of the air return device 130, promoting more circulating airflow in the cart compartment 102. The cart walls 302 of the air-over galley cart 300 may be used to direct the airflow around the cart compartment 102.

A galley system is provided for an aircraft that supplies cooling air to a compartment of a galley for cooling galley carts. The supply and return devices are configured to provide cooling airflow for both air-through galley carts and air-over galley carts such that either type of galley cart is able to be inserted into the cart compartment and cooled. The supply and/or return ducts and supply and/or return devices for the airflow are arranged adjacent each other to reduce a size or footprint of the galley monument. Additional space is provided in the passenger compartment by shifting the walls of the cart compartment inward (e.g., closer to the galley cart), such as for adding additional room for passenger seating.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A galley comprising:
    a cart compartment having a chamber, the cart compartment being defined by a plurality of walls, the plurality of walls comprising a rear wall behind the cart compartment, side walls along sides of the cart compartment, a mid-wall above the cart compartment and a bottom wall below the cart compartment;
    at least one door coupled to the cart compartment to enclose and allow access to the cart compartment;
    a supply duct configured to supply cooled airflow to the cart compartment, the supply duct having an air supply device at the cart compartment, the air supply device having an air-through supply vent at a first position configured to be in flow communication with an air-through galley cart when the air-through galley cart is received in the cart compartment to supply the cooled airflow into an interior of the air-through galley cart, the air supply device having an air-over supply vent at a second position different than the first position configured to be in flow communication with the chamber to supply the cooled airflow into the chamber for cooling exterior surfaces of an air-over galley cart when the air-over galley cart is received in the cart compartment; and
    a return duct configured to extend from the cart compartment to a heat exchanger to return air to the heat exchanger, the return duct having an air return device in flow communication with the return duct and configured to be in flow communication with the cart compartment for receiving the airflow from the cart compartment.

2. The galley of claim 1, wherein the air supply device is provided along the rear wall and the air return device is provided along the mid-wall.

3. The galley of claim 1, wherein the air-through supply vent is open when the air-through galley cart is in the cart compartment and is at least partially closed when the air-over galley cart is in the cart compartment.

4. The galley of claim 1, wherein the air-over supply vent is open when the air-over galley cart is in the cart compartment and is at least partially closed when the air-through galley cart is in the cart compartment.

5. The galley of claim 1, wherein the air-through supply vent directs the air flow directly into the interior of the air-through galley cart and the air-over supply vent directs the air flow directly into the chamber.

6. The galley of claim 1, wherein the air-over supply vent includes a valve movable between an open position and a closed position, the valve being in the open position when the air-over galley cart is in the cart compartment, the valve being in the closed position when the air-through galley cart is in the cart compartment.

7. The galley of claim 6, further comprising a valve controller opening and closing the valve based on the type of galley cart in the cart compartment.

8. The galley of claim 1, wherein the air-through supply vent is configured to be blocked when the air-over galley cart is in the cart compartment.

9. The galley of claim 1, wherein the air supply device includes a front facing the door across the cart compartment and a bottom facing the bottom wall, the air-through supply vent provided in the front to interface with the air-through galley cart, the air-over supply vent being provided in the bottom to direct the air into the chamber.

10. The galley of claim 1, wherein the air return device is provided along the rear wall below the air supply device, the air return device having an air-through return vent configured to be in flow communication with the air-through galley cart when received in the cart compartment to receive airflow from the interior of the air-through galley cart, the air return device having an air-over return vent configured to be in flow communication with the chamber to receive airflow from the chamber and to direct the air from the chamber into the return duct.

11. The galley of claim 1, wherein the rear wall includes a jogged section jogged forward such that the jogged section is aligned with the air supply device below the air supply device.

12. The galley of claim 1, wherein the cart compartment has a first depth between the door and the rear wall below the air supply device and a second depth between the door and the rear wall at the air supply device, the second depth being wider than the first depth.

13. The galley of claim 1, wherein the cart compartment is configured to receive airflow from the air-through galley cart in the chamber and direct such airflow to the air return device.

14. The galley of claim 1, wherein the air supply device includes a delivery chamber, the air-through supply vent receiving air from the delivery chamber, and the air-over supply vent receiving air from the delivery chamber.

* * * * *